(12) United States Patent
Seaman et al.

(10) Patent No.: US 6,620,206 B1
(45) Date of Patent: Sep. 16, 2003

(54) WHITE SPACE EQUALIZATION AROUND FEATURES PLACED ON A PAGE

(75) Inventors: Mark D Seaman, Greeley, CO (US); Donald J Stavely, Windsor, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/238,540

(22) Filed: Jan. 27, 1999

(51) Int. Cl.⁷ .............................................. G06F 15/00
(52) U.S. Cl. ...................... 715/518; 715/517; 715/519; 345/858
(58) Field of Search .............................. 707/517, 518, 707/519; 345/788, 858, 680, 681

(56) References Cited

U.S. PATENT DOCUMENTS

| | | | | |
|---|---|---|---|---|
| 5,031,121 A | * | 7/1991 | Iwai et al. ................... 707/515 |
| 5,072,412 A | * | 12/1991 | Henderson et al. ......... 345/788 |
| 5,642,490 A | * | 6/1997 | Morgan et al. .............. 345/762 |
| 5,848,184 A | * | 12/1998 | Taylor et al. ............... 382/173 |
| 5,956,422 A | * | 9/1999 | Alam ........................... 382/175 |
| 6,123,362 A | * | 9/2000 | Squilla et al. ................. 281/31 |
| 6,134,565 A | * | 10/2000 | Hommersom et al. ...... 707/517 |
| 6,147,768 A | * | 11/2000 | Norris ......................... 358/1.18 |
| 6,209,009 B1 | * | 3/2001 | Schwartz et al. ........... 707/517 |
| 6,229,566 B1 | * | 5/2001 | Matsumoto et al. ........ 348/233 |
| 6,253,220 B1 | * | 6/2001 | Le Beux et al. ............. 707/530 |
| 6,326,970 B1 | * | 12/2001 | Mott et al. ................... 345/439 |
| 6,362,900 B1 | * | 3/2002 | Squilla et al. ............... 358/442 |

FOREIGN PATENT DOCUMENTS

EP          784294 A2  *  7/1997

OTHER PUBLICATIONS

Okamoto et al, A Hybrid Page Segmentation Method, Oct. 1993, IEEE, pp. 743–746.*
Azokly et al., A Language for Document Generic Layout Description and its Use for Segmentation into Regions, Aug. 1995, IEEE, pp. 1123–1126.*
IBM Disclosure Bulletin, Free–Space Search for Best–Fit Placement of New Desktop Objects, Jan. 1994, pp. 455–456.*
IBM Disclosure Bulletin, Formatting Non–Words with Words, Jun. 1989, pp. 9–10.*
IBM Disclosure Bulletin, Reduction in FAX Transmission Costs, Jul. 1993, pp. 201–202.*
IBM Disclosure Bulletin, Enhanced Columns Layout Function for Typewriters/Word Processors, Jun. 1989, pp. 85–86.*

* cited by examiner

Primary Examiner—Stephen S. Hong
Assistant Examiner—Cong-Lac Huynh

(57) ABSTRACT

A method for the equalization of white space around multiple placements of photographs or other placement items with optional, associated captions on a medium such as a page or a computer screen. The method provides techniques for creating aesthetically pleasing layouts for a set of items to be displayed, as for example printed on a sheet of paper by a printer.

15 Claims, 13 Drawing Sheets

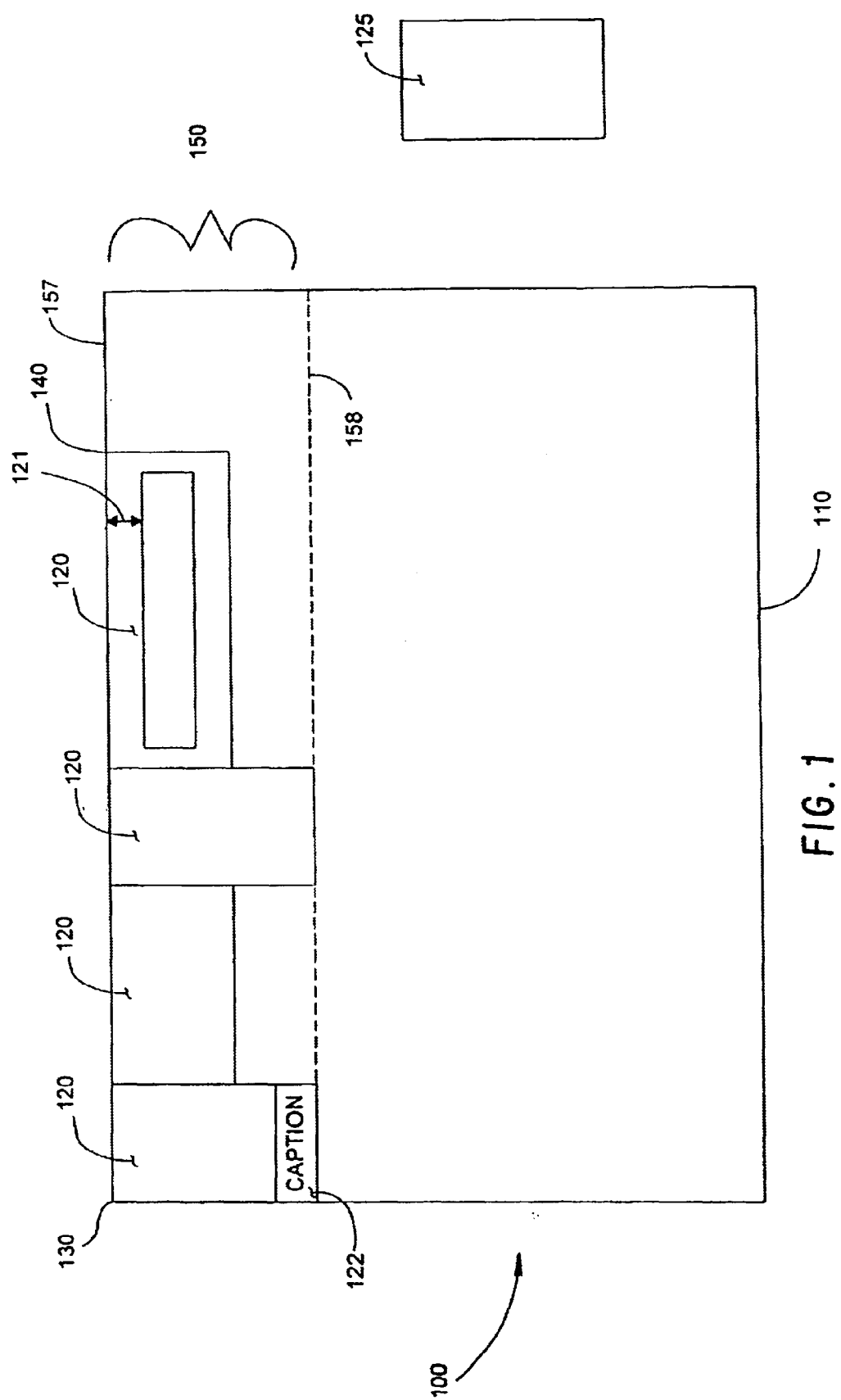

WHITE SPACE EQUALIZATION AROUND FEATURES PLACED ON A PAGE

FIELD OF THE INVENTION

The present invention relates generally to printing features, for example photographs, on a medium such as a page or a computer screen. More particularly it relates to methods used for the equalization of white space around the features placed on the medium.

BACKGROUND OF THE INVENTION

Recent hardware and software advancements have resulted in printers that can print photographic data from multiple photographs on single sheets of paper without the intermediate use of photographic film. When used herein as a noun, "placement" means a rectangular region that represents a photograph or other item, a predefined gap between two placements, and any associated caption.

Typically placement of the photographs, with or without gaps and captions, on the page being arranged occurs in the order in which they appear in a predefined list. Each photograph is placed in order and orientation across the page in one row after another down the page. This approach does not attempt to optimize the placement of photographs in order to obtain a more efficient fit. Such linear placement algorithms often fall short by leaving large amounts of white space on the page.

Other attempts at placing photographs on a page often take into account only one significant attribute by which to make a decision regarding which is the best placement. For example, the largest photograph that will fit without wrapping onto the next row, or the photograph that leaves the smallest amount of space at the end of a row, are both reasonable methods to layout photographs. However, optimizing a single or a pair of attributes is not sufficient to fit a large variety of photographs tightly together. Such approaches fall short of being able to produce a page layout that reflects that which a human would do.

Without some means for equalizing white space, the printed page of photographs appears to have all images crowded into the upper left corner of the page. This problem can be partially addressed by increasing the page margins to leave more white space around the area of the photographs. Another technique is to increase the gap between photographs to show more white space. However, the overall page layout often does not appear balanced. Also, increasing the space between placements seriously limits the size of the photographs which can be placed on a given page.

Thus, for purposes of paper efficiency and aesthetics, there are needs for methods which provide for efficient placement of multiple photographs on a page, for selection of the photograph to be placed, and for equalization of white space in photographic placements.

SUMMARY OF THE INVENTION

The present patent document describes representative embodiments of methods for the efficient placement on a display medium or media of a set of placement items, for selecting a next item to be located on the medium, and for equalizing white space around multiple placement items. The methods described herein provide techniques for creating aesthetically pleasing layouts of the placement items which could be, for example, photographs with optional, associated gaps and captions. The medium used for display could be a page of paper or a computer screen. Either a single medium item or multiple items of a given type medium may be used.

Methods for the efficient location of placement items and for the selection of a next item to be located on the medium provide techniques for reducing the total number of medium items used to display the placement items, i.e., for reducing the total number of pages used to print a set of photographs. Methods for the equalization of white space around multiple placement items provide techniques for creating aesthetically pleasing layouts. Previous methods have been limited in both their abilities to efficiently utilize the available media and to create aesthetically pleasing displays.

Representative embodiments are based on the row oriented location of placement features. The next placement feature to be located is chosen based upon a weighted value which is created for each placement item. This weighted value is determined based upon several parameters which are related to the size and orientation of the placement item, as well as to the remaining space on the current row and on the current display medium. Should the placement item be too large, its orientation may be changed to match that of the display medium, and, if necessary, it may be reduced in size to fit within the boundaries of the display medium. White space is distributed uniformly between and within rows of placement features. The net result of using these techniques is the efficient and aesthetically pleasing location of placement items approximating that which a human being would do.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and:

FIG. 1 is a drawing of a representative embodiment of a composed layout.

DETAILED DESCRIPTION OF THE PREFERRED EMBODIMENTS

1. Introduction

Figure 2A:
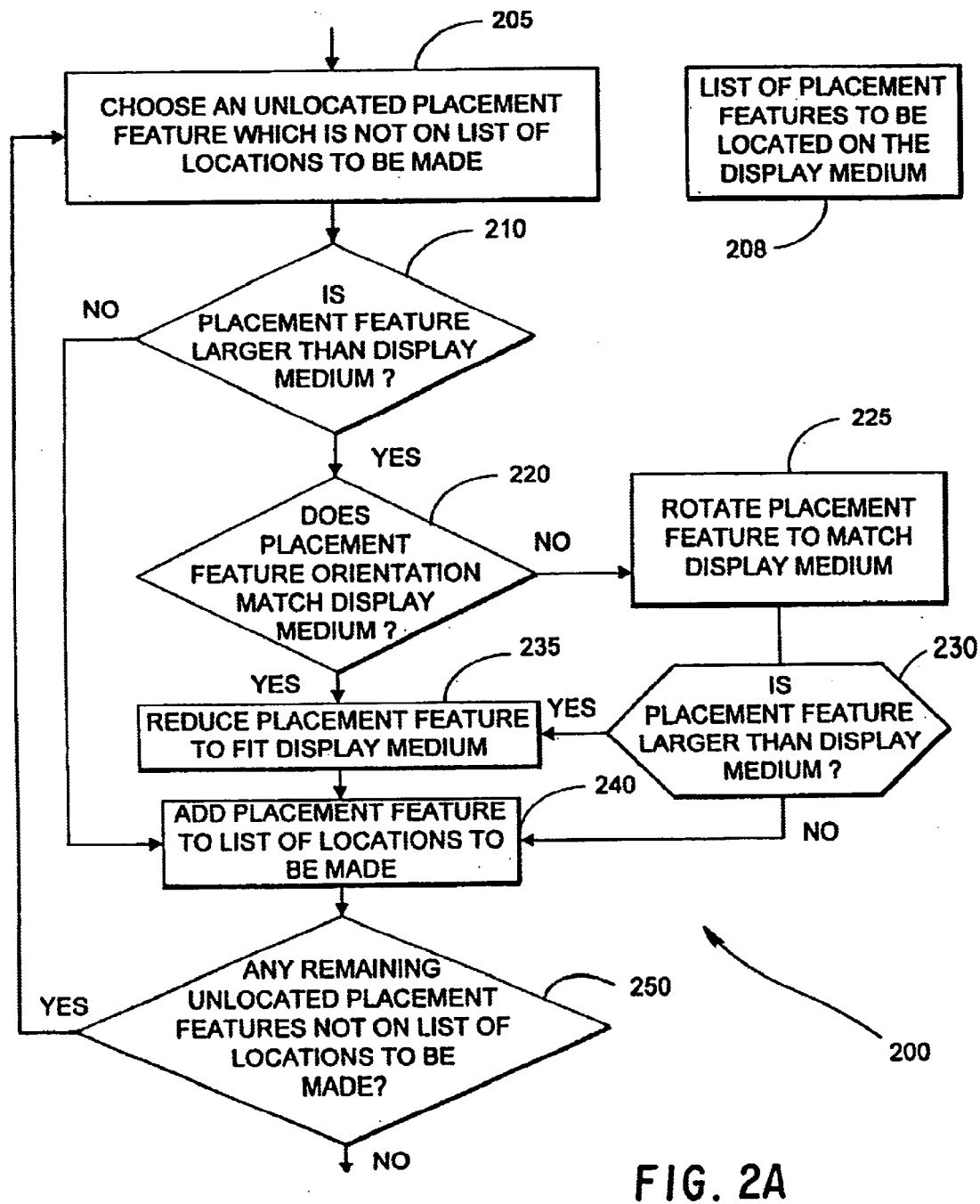
FIG. 2 is a flow chart of representative embodiment of a placement computer program for locating placement features on a display medium.

As shown in the drawings for purposes of illustration, the present patent document relates to methods for efficient placement on a display medium or media of a set of placement items, for selecting a next item to be located on the medium, and for equalizing white space around multiple placement items. The methods described herein provide techniques for creating aesthetically pleasing layouts of the placement items which could be, for example, photographs with optional, associated gaps and captions. The medium used for display could be a page of paper or a computer screen. Either a single medium item or multiple items of a given type medium may be used.

Methods for the efficient location of placement items and for the selection of a next item to be located on the medium provide techniques for reducing the total number of medium items used to display the placement items, i.e., for reducing the total number of pages used to print a set of photographs. Methods for the equalization of white space around multiple placement items provide techniques for creating aesthetically pleasing layouts. Previous methods have been limited in both their abilities to efficiently utilize the available media and to create aesthetically pleasing displays.

In the following detailed description and in the several figures of the drawings, like elements are identified with like reference numerals.

2. Medium & Feature Geometries

FIG. 1 is a drawing of a representative embodiment of a composed layout 100. For illustrative purposes the composed layout 100 is shown partially completed. The composed layout 100 is comprised of a display medium 110 and multiple placement features 120, also referred to herein as features 120, which are shown located on the display medium 110. In representative embodiments, both the display medium 110 and the placement feature 120 are substantially rectangular. The placement features 120 are typically located on the display medium 110 one at a time beginning with a placement origin 130 which in this example is the upper left hand corner of the display medium 110.

An insertion point 140 for the next placement feature 125 to be located on the display medium 110 is shown in the present example as the upper right hand corner of the last placement feature 120 placed on the display medium 110. The upper left hand corner of the next placement feature 125 to be located on the display medium 110 is placed on the insertion point 140. Note that the placement features 120 previously placed on the display medium 110 are located in a row 150. An upper edge 157 and a lower edge 158 of the row 150 are defined by the most extreme upper and lower boundaries of the placement features 120. As previously stated, the placement features 120 may include a predefined gap 121 as shown in one of the placement features 120 of FIG. 1 and a caption 122 as shown in another of the placement features 120 of FIG. 1. If, when the upper left hand corner of the next placement feature 125 is placed at the insertion point 140, the next placement feature 125 extends beyond the lower edge 158 of the row 150, the lower edge 158 of the row 150 is adjusted to that of the lower boundary of the next placement feature 150. If, when the upper left hand corner of the next placement feature 125 is placed at the insertion point 140, the next placement feature 125 extends beyond the right hand edge of the display medium 110, the next placement feature 125 is located so that its left hand edge is contiguous with the left hand edge of the display medium 110. The upper and lower boundaries of the next placement feature 125 now define a new row 150 whose upper edge is contiguous with the lower edge 158 of the previous row 150. If the lower edge of the next placement feature 125 lies below the lower edge of the display medium 110, the next placement feature 125 is located on an additional display medium 110.

3. Page Efficient Photograph Placement

Figure 2B:
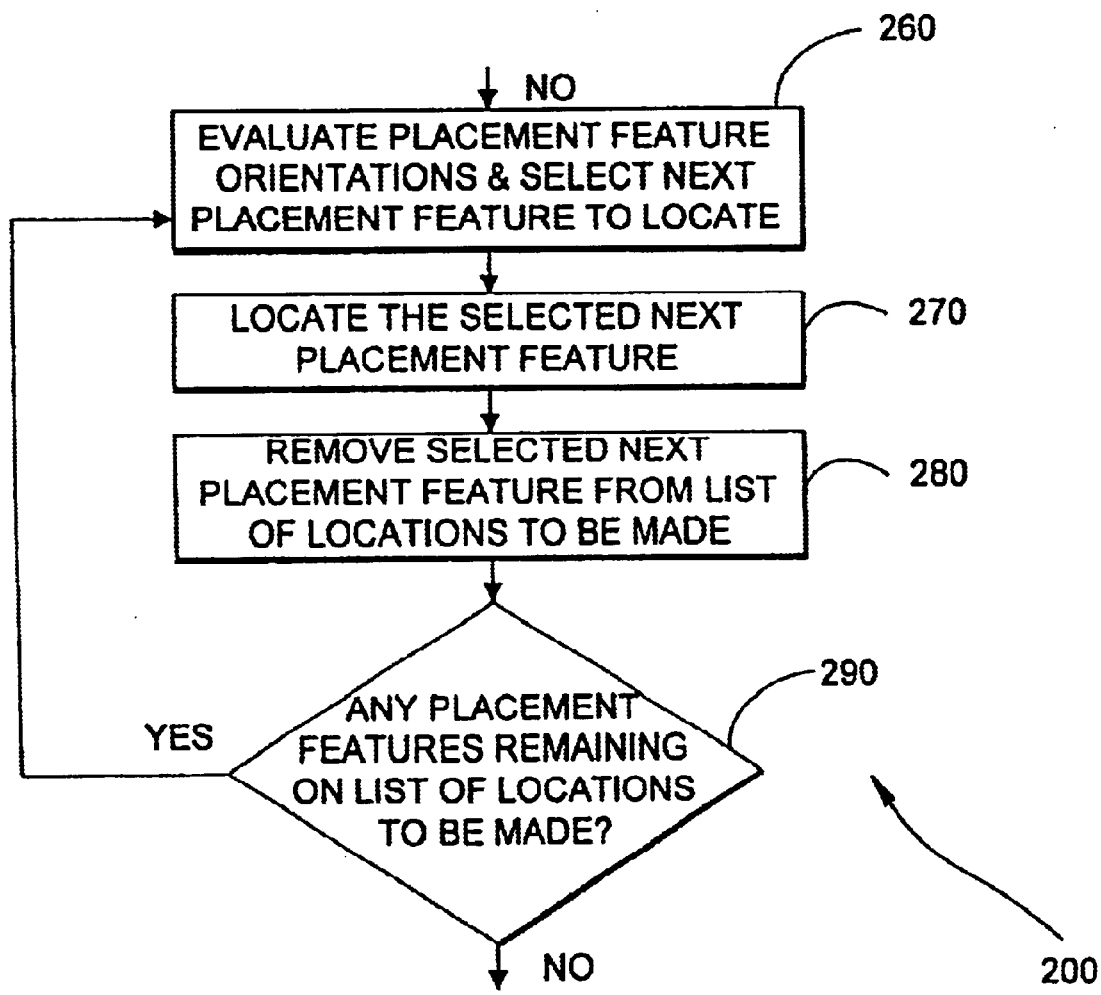

FIG. 2 is a flow chart of representative embodiment of a placement computer program 200 for locating the placement features 120 on the display medium 110.

Block 205 is the initial block of the placement computer program 200. Block 205 chooses an unlocated placement feature which is not on a list 208 of placement features 120 to be located on the display medium 110. In FIG. 2, the list 208 of placement features 120 to be located on the display medium 110 is shown for illustrative purposes only and is not a method step. Block 205 then transfers control to block 210.

When the placement feature 120 chosen by block 205 is larger than the display medium 110, block 210 transfers control to block 220. Otherwise, block 210 transfers control to block 240.

When the orientation of the placement feature 120 chosen by block 205 is the same as the orientation of the display medium 110, block 220 transfers control to block 235. Otherwise, block 220 transfers control to block 225.

Block 225 rotates the placement feature 120 chosen by block 205 to match that of the display medium 110. Block 225 then transfers control to block 230.

When the placement feature 120 chosen by block 205 is larger than the display medium 110 in at least one of its dimensions, block 230 transfers control to block 235. Otherwise, block 230 transfers control to block 240.

Block 235 reduces the size of the placement feature 120 chosen by block 205 to fit within the boundaries of the display medium 110. Block 235 transfers control to block 240.

In an alternate embodiment wherein placement features 120 are not reduced, the decision step of block 230, and the reduction step of block 235 are omitted. For this embodiment, block 225 transfers control to block 240, and when the orientation of the placement feature 120 chosen by block 205 is the same as the orientation of the display medium 110, block 220 transfers control to block 240

In yet another embodiment wherein placement features 120 are not reduced and are not rotated to match that of the display medium 110, the decision method step of block 210, the decision method step of block 220, the rotation method step of block 225, the decision step of block 230, and the reduction step of block 235 are omitted. For this embodiment, block 205 transfers control to block 240.

Block 240 adds the placement feature 120 to the list 208 of placement features 120 to be located on the display medium 110. Block 240 transfers control to block 250.

When there are remaining unlocated placement features 120 not on the list 208 of placement features 120 to be located on the display medium 110, block 250 transfers control to block 205. Otherwise, block 250 transfers control to block 260.

Block 260 evaluates each placement feature 120 on the list 208 of placement features 120 to be located on the display medium 110 for both landscape and portrait orientations of the placement features 120 and selects the next placement feature 120 and orientation to be located on the display medium 110. A representative embodiment of a method for selecting the next placement feature 120 to be located is discussed in sections 4 and 4.1 below. Block 260 transfers control to block 270.

Block 270 locates the selected next placement feature 125. Block 270 transfers control to block 280.

Block 280 removes the selected next placement feature 125 from the list 208 of placement features 120 to be located on the display medium 110. Block 280 transfers control to block 290.

When there are remaining placement features on the list 208 of placement features 120 to be located on the display medium 110, block 290 transfers control to block 260. Otherwise, block 290 terminates the placement computer program 200.

4. Placement Feature Selection

Figure 3:
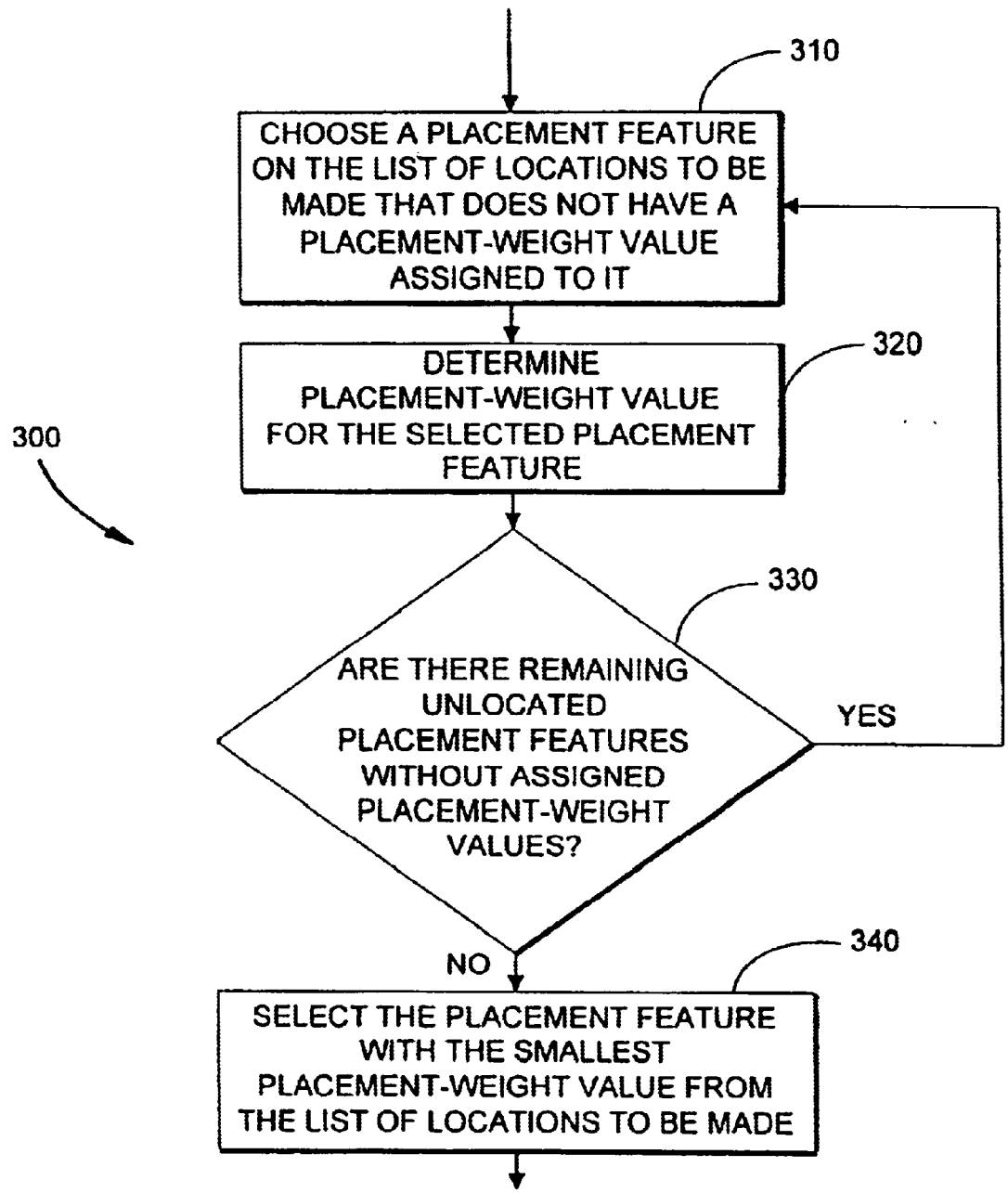
FIG. 3 is a flow chart of a representative embodiment of a selection computer program for selecting the next placement feature to be located on the display medium.

FIG. 3 is a flow chart of a representative embodiment of a selection computer program 300 for selecting the next placement feature 120 to be located on the display medium 110. In a representative embodiment, the selection computer program 300 replaces block 260 of FIG. 2.

Figure 4:
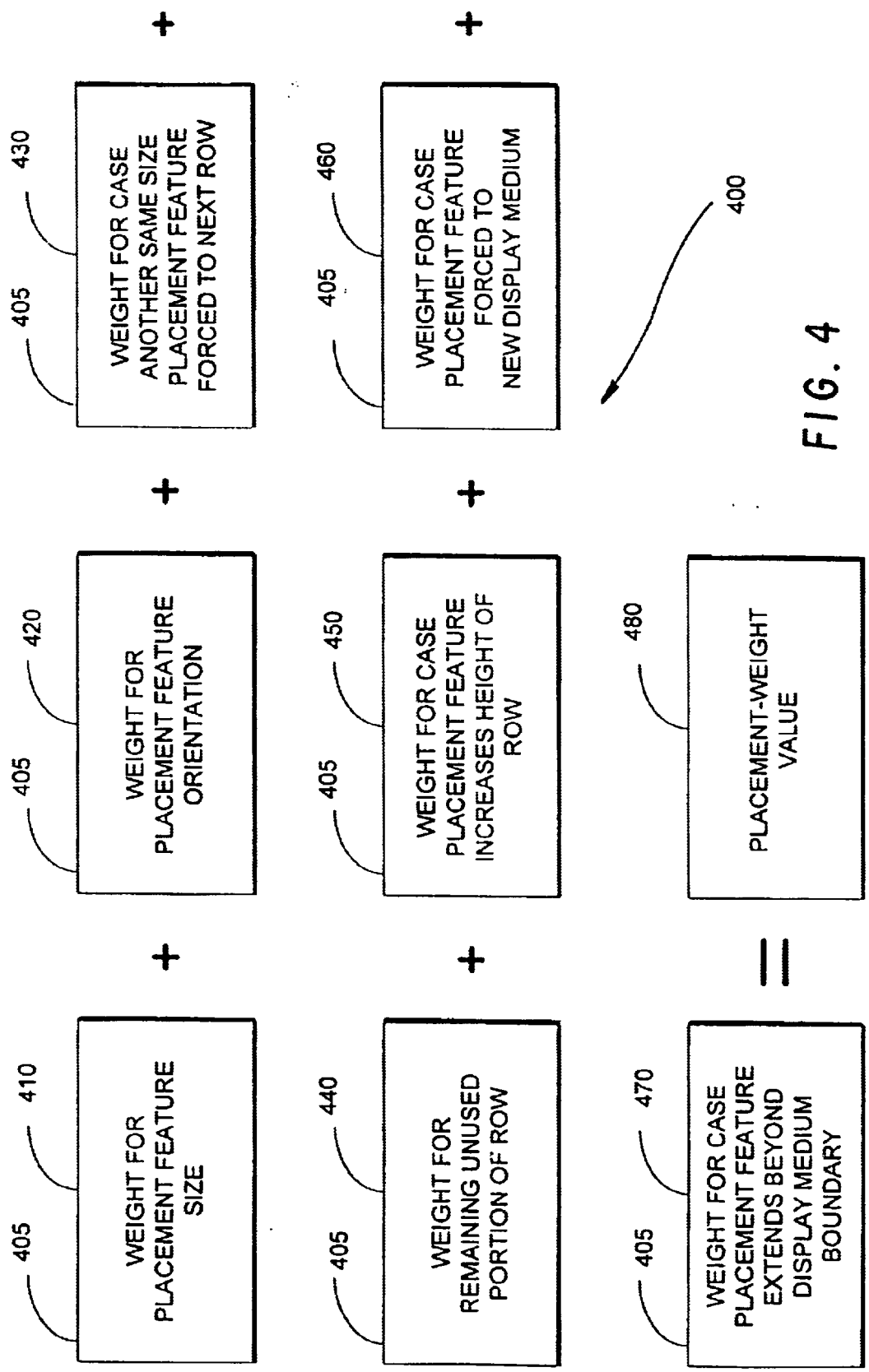
FIG. 4 is a diagram of a placement-weight equation used to determine a placement-weight value for the placement features.

Block 310 is the initial block of the placement feature 120 selection computer program 300 and chooses one of the unlocated placement features 120 from the list 208 of placement features 120 to be located on the display medium 110 for which a placement-weight value 480 has not been computed. The placement-weight value 480 and the elements that comprise it are shown in FIG. 4. FIG. 4, the placement-weight value 480, and the method in which the placement-weight value 480 is determined are more fully discussed in section 4.1 below. Block 310 transfers control to block 320.

Block 320 determines the placement-weight value 480 for the placement feature 120 selected by block 310. Block 320 transfers control to block 330.

When there are remaining unlocated placement features 120 without assigned placement-weight values on the list 208, block 330 transfers control to block 310. Otherwise, block 330 transfers control to block 340.

Block 340 selects as the next placement feature 125 to be located on the display medium 110 the placement feature 120 having the smallest algebraic placement-weight value 480 from the list 208 of placement features 120 to be located on the display medium 110. Block 340 then terminates the selection computer program 300. Other criteria for the selection of the next placement feature 125, such as for example selecting the placement feature 120 having the largest algebraic placement-weight value 480 are also possible depending upon the composition of the placement-weight values 480.

4.1 Placement-Weight Value for Placement Feature

FIG. 4 is a diagram of a placement-weight equation 400 used to determine the placement-weight value 480 for the placement features 120. The placement-weight equation 400 is a representative embodiment of a selection criteria 400 used for selecting the order of placement feature 120 location on the display media 110. The placement-weight values 480 for the placement features 120 that have not been previously located on the display medium 110 are used to determine which of the placement features 120 is to be located next on the display medium 110. In the representative embodiment of the placement-weight equation 400 shown in FIG. 4, the placement-weight value 480 comprises the sum of multiple selection values 405. The selection values 405 may have either a positive or a negative value. The value of the placement-weight value 480 may also be either positive or negative. In a representative embodiment, priority of placement is greater for the placement features 120 having the smaller algebraic values for the placement-weight value 480. While in FIG. 4 selection values 405 are combined via addition to form placement-weight values 480, other techniques such as multiplication, division, and subtraction may also be use in part or in total.

The following paragraphs provide detail regarding the various selection values 405 shown in FIG. 4.

In a representative embodiment, a weight for placement feature size 410 is given by $$-H*W/C1 \qquad [\text{Eq. 1}]$$

wherein H=height of the placement feature 120, W=width of the placement feature 120, and C1 is a constant chosen by the user. Equation 1 gives preference to the larger display features 120. A typical value for C1 is 10.

In a representative embodiment, a weight for placement feature orientation 420 is given by $$(W-H)*C2 \qquad [\text{Eq. 2}]$$

which provides a preference to the portrait orientation. C2 is a constant chosen by the user. A typical value for C2 is 1.

In a representative embodiment, a weight for the case an additional same size placement feature 120 beyond the present placement 120 is forced to the next row 430 is given by $$(\text{medium width}-X-2*W)*H/C3 \qquad [\text{Eq. 3}]$$

wherein X=the horizontal coordinate of the insertion point 140 as measured from the placement origin 130. Equation 3 provides a penalty if two placement features 120 of the same size as the one being evaluated will not fit on the remaining portion of the current row 150. C3 is a constant chosen by the user. A typical value for C3 is 10.

In a representative embodiment, a weight for the remaining unused portion of the row 440 after location of the placement feature 120 is given by $$(\text{Page Width}-X-W)*\text{Height of line}/C4 \qquad [\text{Eq. 4}]$$

Equation 4 gives provides a penalty if the remaining portion of the row 150 is not used. C4 is a constant chosen by the user. A typical value for C4 is 10.

In a representative embodiment, a weight for the case the placement feature 120 increases the height of the row 450 is given by $$X*\text{New Height of Line} \qquad [\text{Eq. 5}]$$

Equation 5 provides a penalty for extending the height of the row 150.

In a representative embodiment, a weight for case placement feature forced to new item of display medium 460 is given by $$\text{Page Width}*(\text{Page Height}-\text{Next } Y) \qquad [\text{Eq. 6}]$$

wherein Y=the vertical coordinate of the insertion point 140 as measured from the placement origin 130. Equation 6 provides a penalty if selection of this placement feature 120 would force location on a new item of display medium 110.

In a representative embodiment, a weight for the case the placement feature extends beyond display medium boundary 470 is given by $$\text{Page Penalty} \qquad [\text{Eq. 7}]$$

A typical value for Page Penalty is 1,000 if the placement feature 120 being evaluated extends beyond the boundary of the display medium 110. Otherwise, the Page Penalty is zero. Selection of these values helps to insure that extending beyond the page boundary overrides all other considerations.

Typical values for the constants in Equations 1–7 above are chosen as representative of placement features 120 in the size range of 3"×5" to 8"×10" having resolutions of 150 pixels per inch and located on an 8½"×11" page.

Other embodiments for the selection values 405 and the placement-weight value 480 are also possible. For example, the placement-weight value 480 could comprise selection values 405 not listed above. In addition, the placement-weight value 480 could be composed of a sub-set of the selection values 405 shown in FIG. 4.

4.2 Summary of Selection Value Parameters

Figure 5:
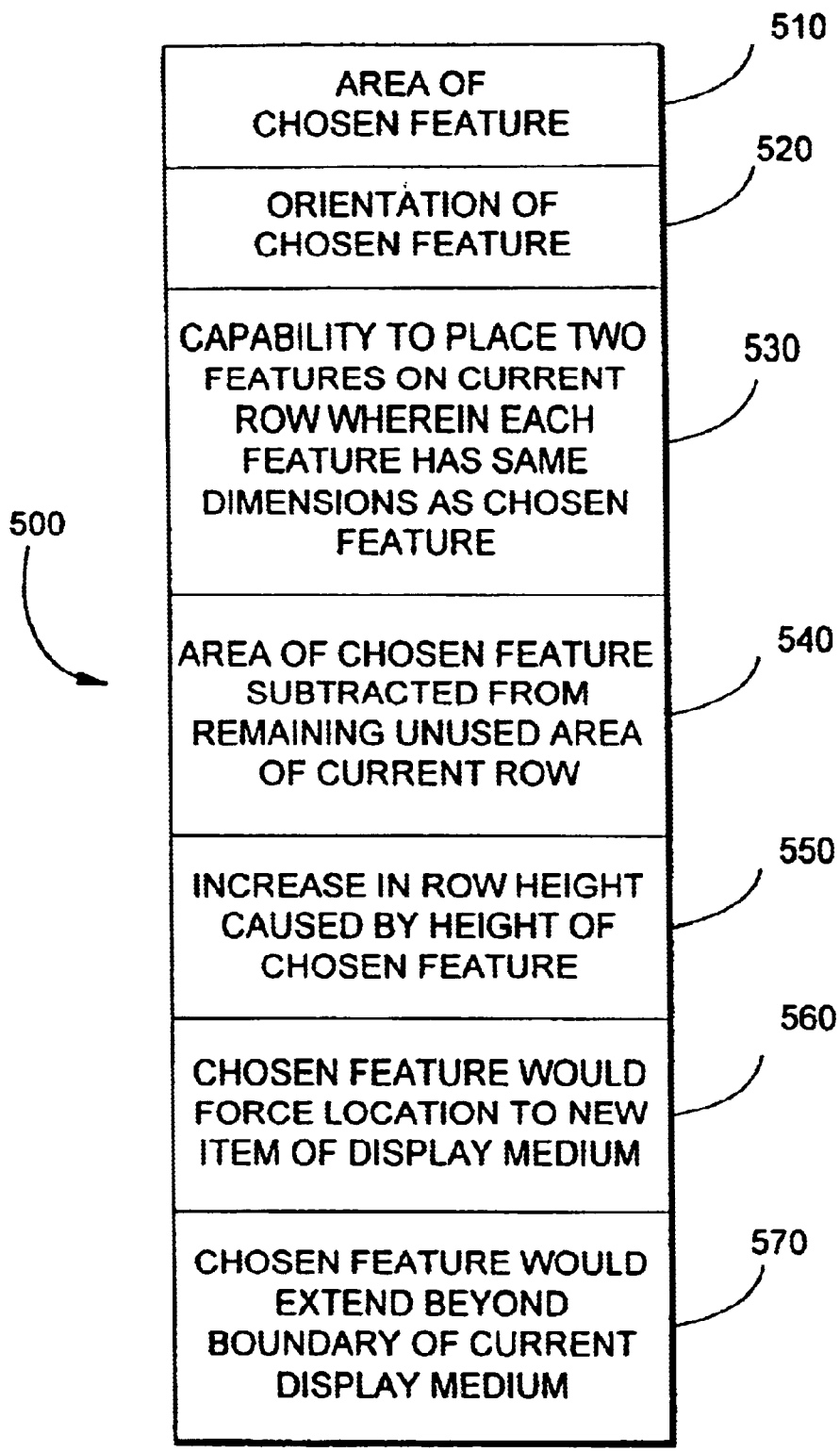
FIG. 5 is a drawing showing parameters used in the placement-weight equation of FIG. 4.

FIG. 5 is a drawing showing parameters 500 used in the equations of section 4.1. These parameters 500 are as follows: (a) chosen feature area 510, (b) chosen feature orientation 520, (c) capability to place two features on the current row, wherein each feature has the same dimensions as the chosen feature 530, (d) the area of the chosen feature subtracted from the remaining unused area of current row 540, (e) increase in row height caused by height of the chosen feature 550, (f) chosen feature would force location to new item of display medium 560, and (g) chosen feature would extend beyond boundary of current display medium 570.

5. Location Program

Figure 6:
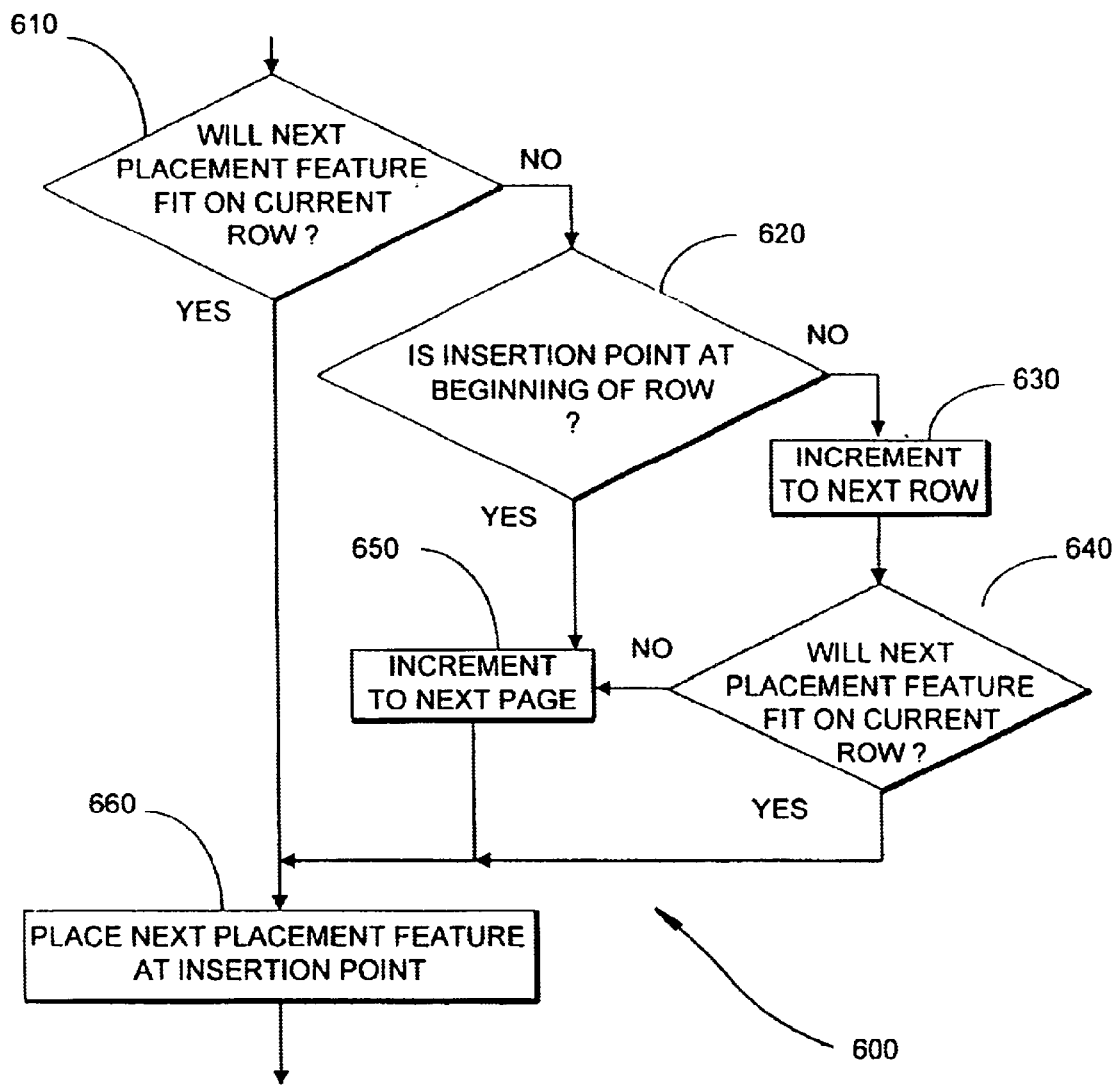
FIG. 6 is a flow chart of a representative embodiment of a location computer program for locating the next placement feature to be located on the display medium.

FIG. 6 is a flow chart of a representative embodiment of a location computer program 600 for locating the next placement feature 125 to be placed or located on the display medium 110. In a representative embodiment, the location computer program 600 replaces block 270 of FIG. 2.

When the next placement feature 125 fits on the current row, block 610 transfers control to block 660. Otherwise, block 610 transfers control to block 620.

When the insertion point 140 is at the beginning of the row 150, block 620 transfers control to block 650. Otherwise, block 620 transfers control to block 630.

Block 630 increments the insertion point 140 to the beginning of the next row 150. Block 630 transfers control to block 640.

When the next placement feature 125 fits on the current row 150, block 640 transfers control to block 660. Otherwise, block 640 transfers control to block 650.

Block 650 increments the insertion point 140 to the beginning of the next page. Block 650 transfers control to block 660.

Block 660 places the next placement feature 125 on the display medium 110. Block 660 is the termination point of the location computer program 600.

6. White Space Equalization

Figure 7:
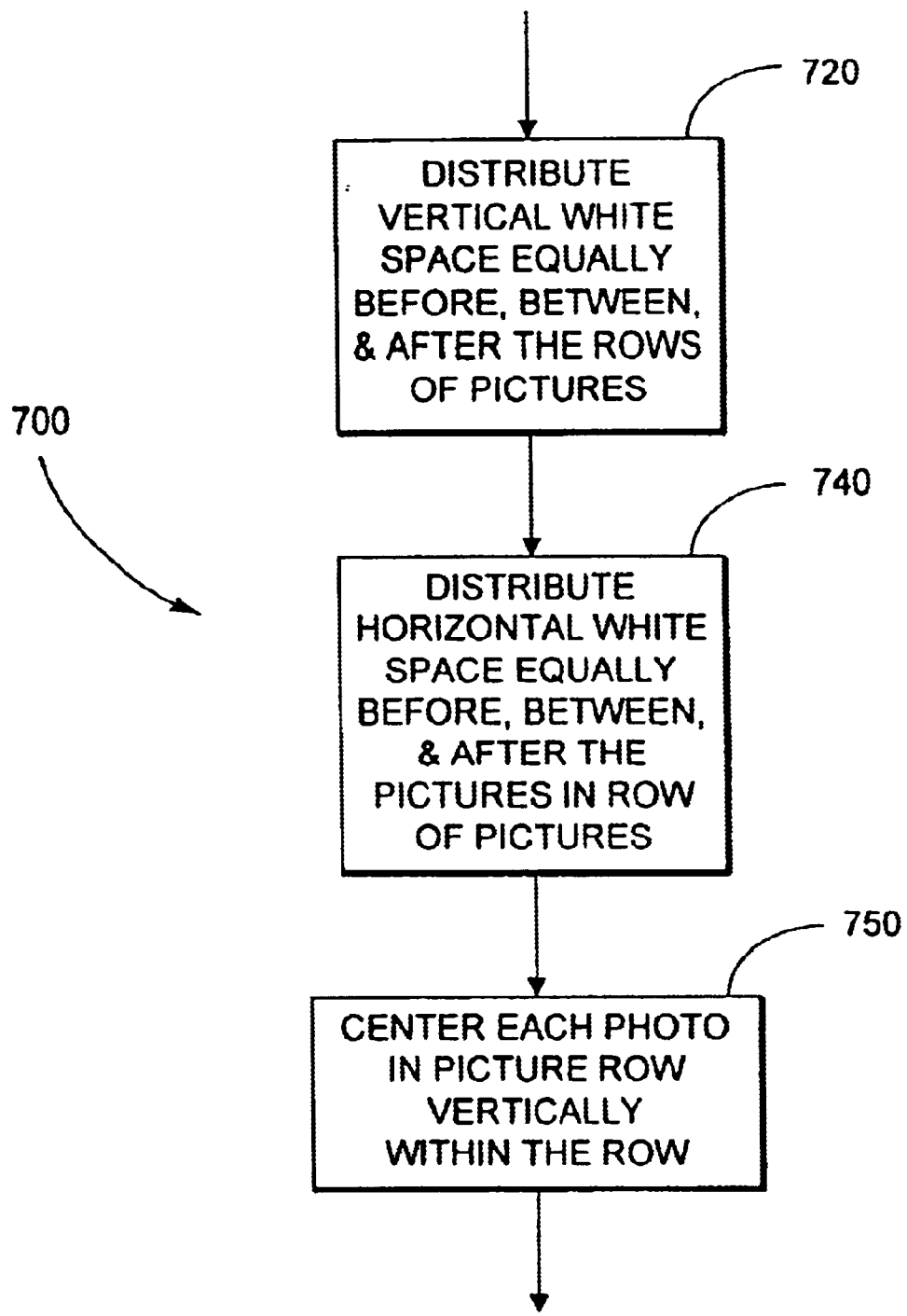
FIG. 7 is a flow chart of a representative embodiment of a white space equalization computer program for equalizing white space horizontally and vertically between placement features on the composed layout.

FIG. 7 is a flow chart of a representative embodiment of a white space equalization computer program 700 for equalizing white space horizontally and vertically between placement features 120 on the composed layout 100. FIG. 7 will be discussed in more detail following the discussion of FIG. 8.

Figure 8:
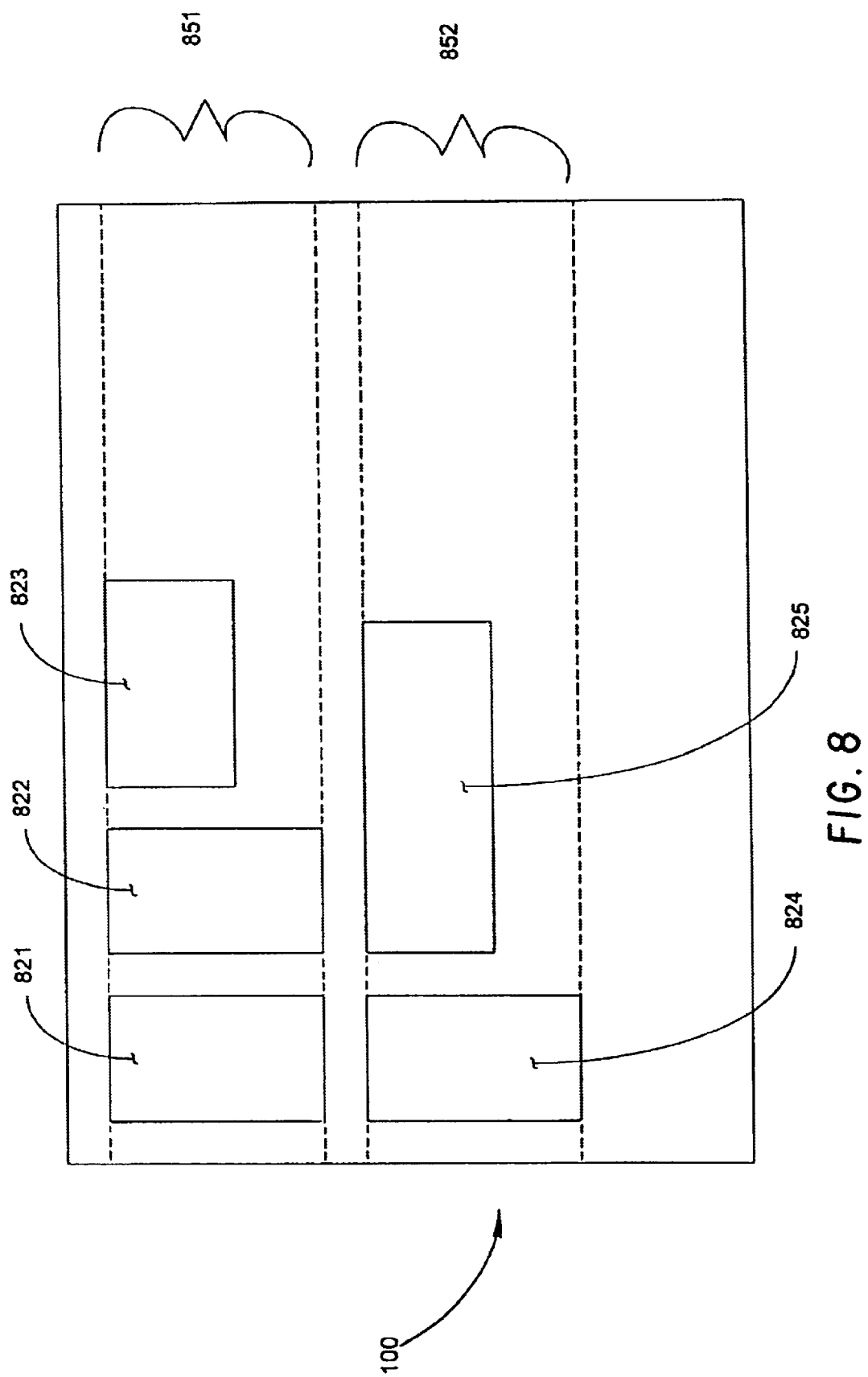
FIG. 8 is a drawing of an illustrative example of composed layout prior to white space equalization.

FIG. 8 is a drawing of an illustrative example of composed layout 100 prior to white space equalization. In FIG. 8, first, second, and third placement features 821,822,823 are located in a first row 851, and fourth and fifth placement features 824,825 are located in a second row 852. All area on the display medium 110 not occupied by the placement features 821,822,823,824,825 is treated as white space.

Figure 9:
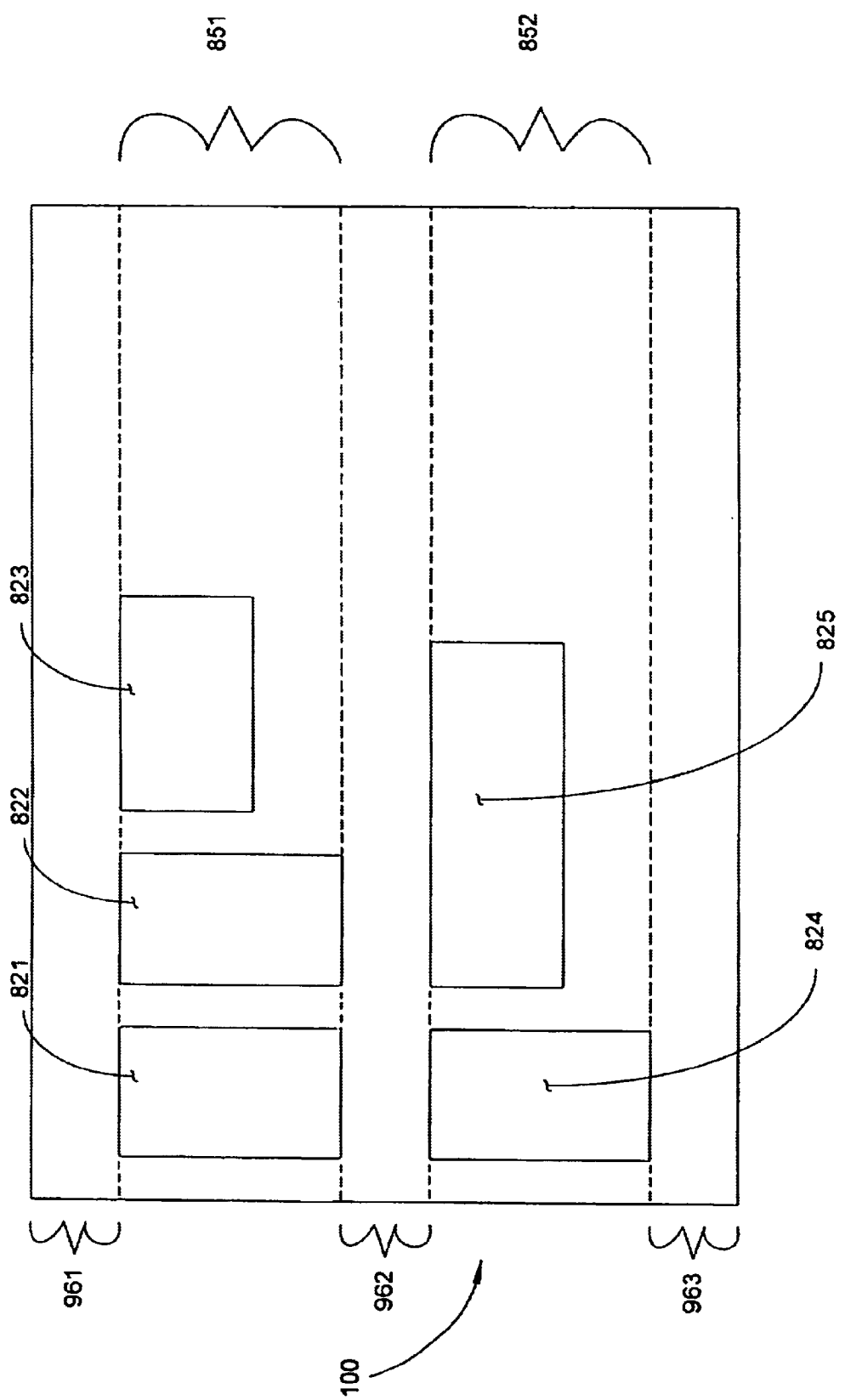
FIG. 9 is a drawing of the illustrative example of FIG. 8 following distribution of white space vertically.

FIG. 9 is a drawing of the illustrative example of FIG. 8 following distribution of white space vertically. First, second, and third inter-row vertical white spaces 961,962, 963 are distributed equally in height above, between, and below first and second rows 851,852 of placement features 821,822,823,824,825. Other embodiments, as for example, predefined sizes of white space at the upper and lower boundaries of the display medium 110 are also possible.

Figure 10:
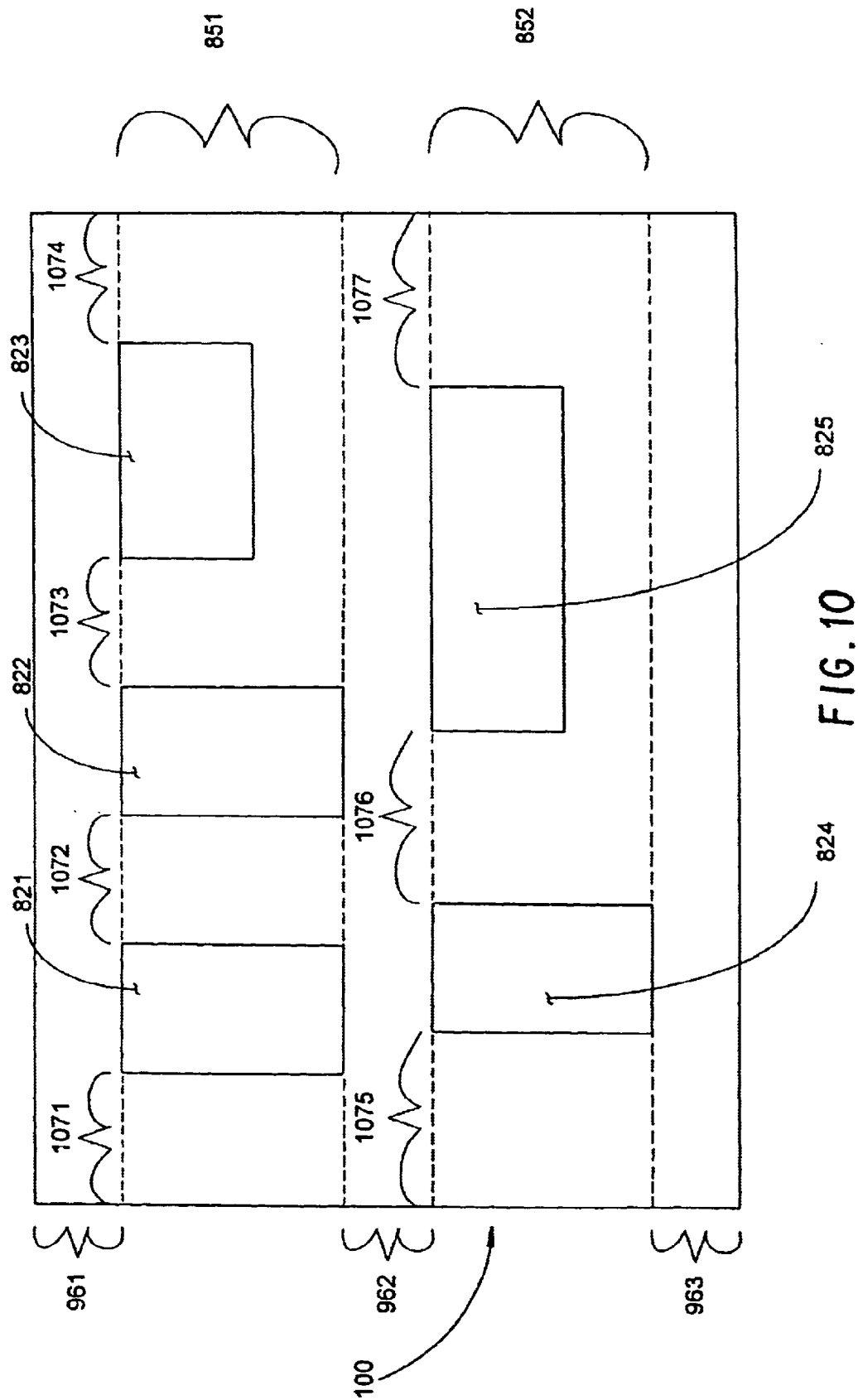
FIG. 10 is a drawing of the illustrative example of FIG. 9 following distribution of white space horizontally.

FIG. 10 is a drawing of the illustrative example of FIG. 9 following distribution of white space horizontally. First, second, third, and fourth horizontal white spaces 1071,1072, 1073,1074 are distributed equally in width before, between, and after first, second, and third placement features 821, 822,823 in first row 851. Fifth, sixth, and seventh horizontal white spaces 1075,1076,1077 are distributed equally in width before, between, and after fourth and fifth placement features 824,825 in second row 852. Other embodiments, as for example, predefined sizes of white space at the left and right boundaries of the display medium 110 are also possible.

Figure 11:
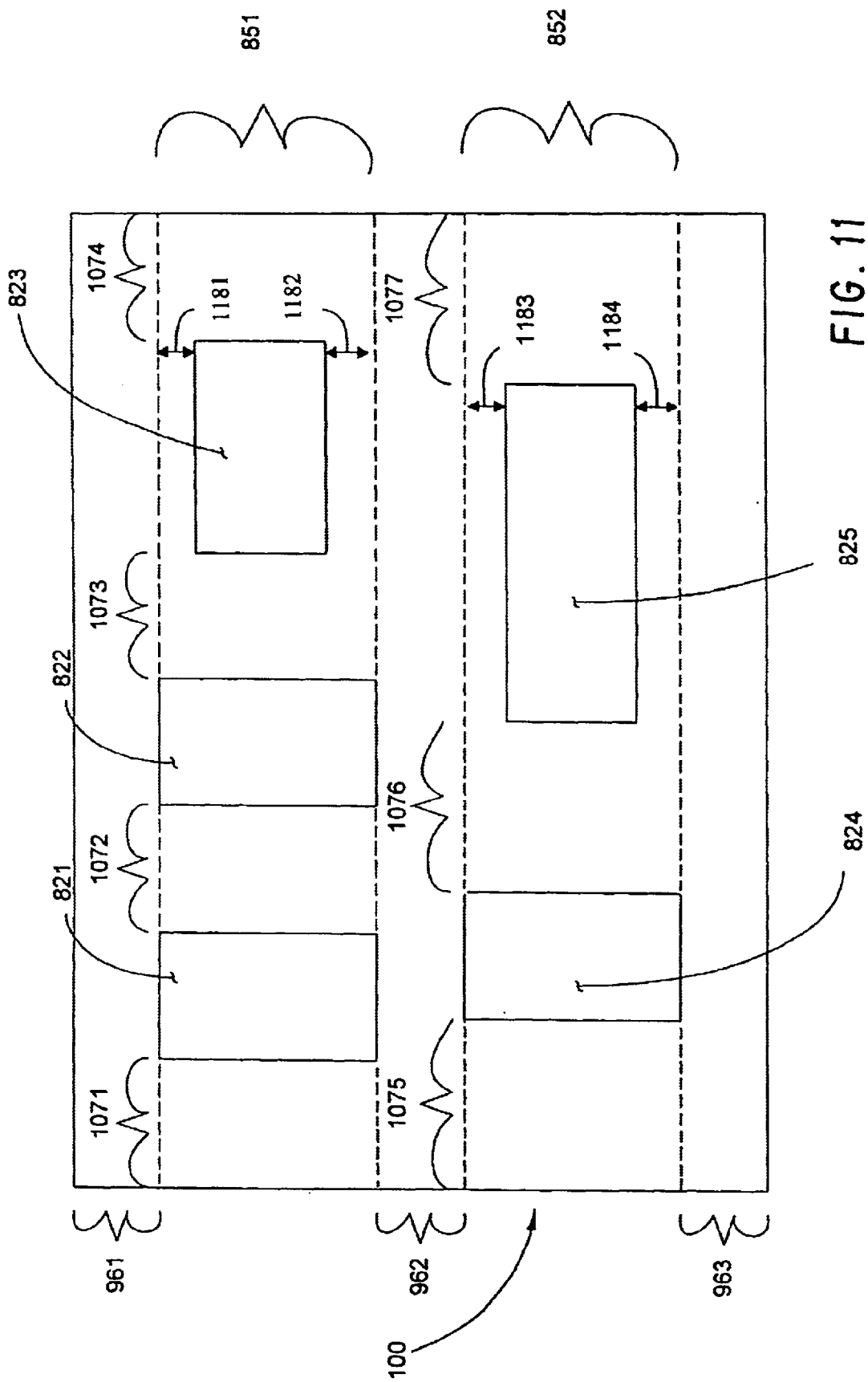
FIG. 11 is a drawing of the illustrative example of FIG. 10 following further distribution of white space vertically.

FIG. 11 is a drawing of the illustrative example of FIG. 10 following further distribution of white space vertically. First and second intra-row vertical white spaces 1181,1182 are distributed equally in height above and below the third placement feature 823 in first row 851. Third and fourth intra-row vertical white spaces 1183,1184 are distributed equally in height above and below the fifth placement feature 825 in second row 852.

Returning to the flow chart of FIG. 7, block 720 is the initial block of the white space equalization computer program 700. Block 720 distributes vertical white space equally above, between, and below the rows 851,852 of placement features 120 on the display medium 110. In the illustrative example of FIGS. 8–11, block 720 distributes first, second, and third inter-row vertical white space 961,962,963 equally above, between, and below the rows 851,852 of placement features 821,822,823,824,825. Block 720 transfers control to block 740.

Block 740 distributes horizontal white space equally before, between, and after placement features 120 within each row 851,852 on the display medium 110. In the illustrative example of FIGS. 8–11, block 740 distributes first, second, third, and fourth horizontal white spaces 1071, 1072,1073,1074 equally before, between, and after first, second, and third placement features 821,822,823. Also in this illustrative example block 730 distributes fifth, sixth, and seventh horizontal white spaces 1075,1076,1077 equally before, between, and after fourth and fifth placement features 824,825. Block 740 transfers control to block 750.

Block 750 centers each placement feature 120 vertically within the row 851,852 in which it is located. In the illustrative example of FIGS. 8–11, block 750 centers placement features 821,822,823 vertically within row 851. Also in this illustrative example block 750 centers placement features 824,825 vertically within row 852. Block 750 terminates the white space equalization computer program 700.

7. Composition & Print System

Figure 12:
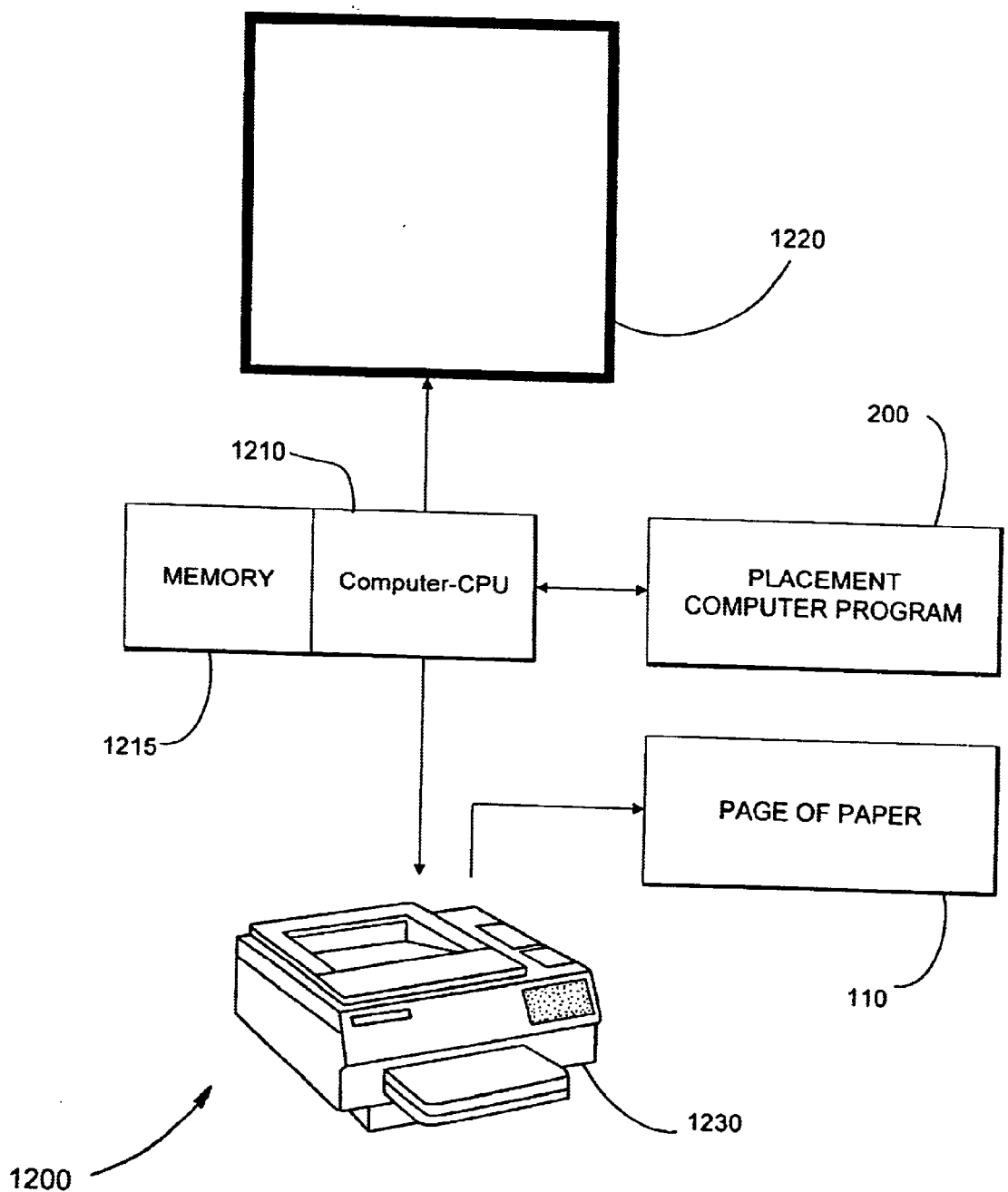
FIG. 12 is a drawing of a computer system used to create and print a composed layout in a representative embodiment.

FIG. 12 is a drawing of a computer system 1200 used to create and print a composed layout 100 in a representative embodiment. The computer system 1200 comprises a computer-CPU 1210, a memory 1215, a computer monitor 1220, a printer 1230, and the placement computer program 200. The placement computer program 200 is stored within the memory 1215, runs on the computer-CPU 1210, and creates the composed layout 100 shown in FIG. 1. The memory 1215 is also referred to as the computer program storage medium 1215 and may be separate from or a part of the computer-CPU 1210. Once the composed layout 100 is created, the placement computer program 200 can enable the printer 1230 to print the composed layout 100 on the display medium 110 which could be a sheet of paper 110. The composed layout 100 could also be displayed on the computer monitor 1220.

8. Concluding Remarks

Representative embodiments described in the present patent document provide methods for the efficient location of placement features 120 on display medium 110, selection of the next placement feature 120 to be placed on the display medium 110, and equalization of white space around placement features 120. These methods provide the ability to create visually more pleasing, balanced compositions and to reduce the total number of items of display medium 110 required for a given set of placement features 120.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A method for equalizing white space around multiple features located in at least two rows on a display medium, comprising the steps of:

distributing the white space equally above, below, and between the rows, wherein the features comprise image data;

distributing the white space equally before, between, and after each feature within each row, wherein at least one row comprises at least two features that have different widths; and centering each feature vertically within each row, wherein at least one row comprises at least two features that have different heights.

2. The method of claim 1, providing the display medium is selected from the group consisting of a computer display screen and a sheet of paper.

3. The method of claim 1, providing the feature comprises a photograph.

4. The method of claim 3, providing the photograph includes a predefined gap.

5. The method of claim 3, providing the photograph includes a caption.

6. A computer program storage medium readable by a computer, embodying a computer program of instructions executable by the computer to perform method steps for equalizing white space around multiple features located in at least two rows on a display medium, the steps comprising:

distributing the white space equally above, below, and between the rows, wherein the features comprise image data;

distributing the white space equally before, between, and after each feature within each row, wherein at least one row comprises at least two features that have different widths; and centering each feature vertically within each row, wherein at least one row comprises at least two features that have different heights.

7. The computer program storage medium of claim 6, providing the display medium is selected from the group consisting of a computer display screen and a sheet of paper.

8. The computer program storage medium of claim 6, providing the feature comprises a photograph.

9. The computer program storage medium of claim 8, providing the photograph includes a predefined gap.

10. The computer program storage medium of claim 8, providing the photograph includes a caption.

11. A computer system configured for use in computer graphics operations, comprising:

a memory containing:

a computer program having functions for equalizing white space around multiple features located in at least two rows on a display medium, the functions comprising:

distributing the white space equally above, below, and between the rows, wherein the features comprise image data;

distributing the white space equally before, between, and after each feature within each row, wherein at least one row comprises at least two features that have different widths; and centering each feature vertically within each row, wherein at least one row comprises at least two features that have different heights; and a processor for running the computer program.

12. The computer system of claim 11, wherein the display medium is selected from the group consisting of a computer display screen and a sheet of paper.

13. The computer system of claim 11, wherein the feature comprises a photograph.

14. The computer system of claim 13, wherein the photograph includes a predefined gap.

15. The computer system of claim 13, wherein the photograph includes a caption.

* * * * *